(12) United States Patent
Walters et al.

(10) Patent No.: US 11,488,186 B2
(45) Date of Patent: Nov. 1, 2022

(54) RECOMMENDATION SYSTEM FOR PATTERNED PURCHASES

(71) Applicant: Capital One Services, LLC, McLean, VA (US)

(72) Inventors: Austin Walters, Savoy, IL (US); Jeremy Goodsitt, Champaign, IL (US); Galen Rafferty, Mahomet, IL (US); Anh Truong, Champaign, IL (US); Reza Farivar, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 57 days.

(21) Appl. No.: 16/855,413

(22) Filed: Apr. 22, 2020

(65) Prior Publication Data
US 2021/0334832 A1    Oct. 28, 2021

(51) Int. Cl.
*G06Q 30/02* (2012.01)
*G06Q 10/06* (2012.01)
*G06K 9/62* (2022.01)
*H04W 4/029* (2018.01)
*G06N 20/00* (2019.01)

(52) U.S. Cl.
CPC ....... *G06Q 30/0205* (2013.01); *G06K 9/6221* (2013.01); *G06N 20/00* (2019.01); *G06Q 10/0635* (2013.01); *G06Q 10/06314* (2013.01); *G06Q 10/06375* (2013.01); *G06Q 30/0282* (2013.01); *H04W 4/029* (2018.02)

(58) Field of Classification Search
CPC ........... G06Q 30/0205; G06Q 30/0201; G06Q 30/0207; G06Q 30/0282; G06Q 30/0639; G06Q 10/06314; G06Q 10/0635; G06Q 10/06375; H04W 4/029; G06N 20/00; G06N 3/08; G06K 9/6221
See application file for complete search history.

(56) References Cited

U.S. PATENT DOCUMENTS

| | | | |
|---|---|---|---|
| 2014/0222506 A1* | 8/2014 | Frazer | G06Q 30/02 705/7.29 |
| 2016/0224803 A1* | 8/2016 | Frank | G06F 16/24578 |
| 2016/0267377 A1* | 9/2016 | Pan | G06Q 30/0201 |

(Continued)

OTHER PUBLICATIONS

"A Recommender System for Hero Line-Ups in MOBA Games", by Lucas Hanke, Luiz Chainmowicz, Computer Science Department, Universidae Federal De Minas Gerais, Proceedings, The Thirteencth AAAI Conference on Artificial Intelligence and Interactive Digital Entertainment, 2017. (Year: 2017).*

(Continued)

*Primary Examiner* — Pan G Choy
(74) *Attorney, Agent, or Firm* — Banner & Witcoff, Ltd.

(57) ABSTRACT

Systems as described herein may include making recommendations for patterned purchases. Transaction information for a user that is associated with a plurality of merchants in a geographic location may be received. Frequencies of visits and transaction patterns associated with the plurality of merchants may be determined. Risk factors and a success rate that the user to complete shopping successfully may be determined. In a variety of embodiments, after detecting that the success rate falls below a threshold value, a recommendation for the user to shop at an alternative merchant and alternative time/date may be presented to the user.

18 Claims, 5 Drawing Sheets

(56) References Cited

U.S. PATENT DOCUMENTS

| | | | | |
|---|---|---|---|---|
| 2017/0124613 | A1* | 5/2017 | Beyagudem | G06Q 30/0631 |
| 2017/0169500 | A1* | 6/2017 | Merz | G06Q 30/0631 |
| 2017/0286622 | A1* | 10/2017 | Cox | G06Q 10/06 |
| 2018/0260875 | A1* | 9/2018 | Jayaraman | G06Q 30/0631 |
| 2018/0365715 | A1 | 12/2018 | Malhotra et al. | |
| 2019/0333073 | A1* | 10/2019 | Harris | G06Q 30/02 |
| 2020/0219004 | A1* | 7/2020 | Daly | G06N 5/045 |
| 2020/0372524 | A1* | 11/2020 | Srivastava | G06Q 30/0202 |
| 2021/0170230 | A1* | 6/2021 | Tormasov | G06Q 50/20 |

OTHER PUBLICATIONS

"Discrete Optimization Problems under Ranking-Based Choice Models", by Alice Joanna Paul, A dissertation presented to the Faculty of the Graduate School of Cornell University, Published by ProQuest LLC, 2017. (Year: 2017).*

"Recommending people to people: the nature of reciprocal recommenders with a case study in online dating", Pizzato et al., Computer Human Adapted Interaction, School of Information Technologies, University of Sydney, NSW 2006, Australia. Published online @ Springer Science + Business: Aug. 10, 2012. (Year: 2012).*

"Economics in E-Commerce Recommendation: Producer, Consumer and Platform", by Qi Zhao, Technology and Information Management, University of California, Santa Cruz, CA USA, Sep. 2016. (Year: 2016).*

* cited by examiner

RECOMMENDATION SYSTEM FOR PATTERNED PURCHASES

FIELD OF USE

Aspects of the disclosure relate generally to data analytics and more specifically to the processing and management of transaction data.

BACKGROUND

In an electronic payment processing network, a financial institution may receive transaction information from merchants for transactions originated from numerous consumers. The customers typically tend to go shopping at the same merchants at preferred times. Therefore, there is a need to automatically notify customers when their typical shopping locations are likely to be unavailable.

Aspects described herein may address these and other problems, and generally improve the quality, efficiency, and speed of processing transaction data to determine transaction patterns and make recommendation for patterned purchases.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include providing a recommendation system for patterned purchases. A recommendation system may receive transaction information from a plurality of merchants in a geographic location. The recommendation system may also receive operation information related to the merchants, and receive compiled information such as weather or traffic information related to the geographic location. The recommendation system may identify frequencies of visits to the merchants and determine a transaction pattern for a user, indicating the frequency at which the user tends to shop at a particular merchant and/or geographic location at a particular time. The recommendation system may determine a plurality of risk factors that may impact the user's shopping experience and a predicted success rate for the user to complete shopping successfully at a future time. After detecting that the predicted success rate falls below a threshold value, the recommendation system may recommend to the user an alternative time/date or an alternative merchant that more likely allows the user to shop successfully.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and systems for making recommendations for patterned purchases based on transaction information, compiled weather and traffic information associated with a geographic location, and/or the operation information of particular merchants. The recommendation system may assign a first set of risk factors to a machine learning classifier and determine a first confidence score for a user to shop successfully. The recommendation system may assign a second set of risk factors to the machine learning classifier and determine a confidence score for a user to shop successfully. Based on a comparison of the first and second confidence scores, the machine learning classifier may be trained with an appropriate set of risk factors and the corresponding weight factor for each factor. The risk factors may include events associated with a store closing, a negative weather pattern or a negative traffic pattern.

After the machine learning classifier is trained, the recommendation systems as described herein allow for determining a first success rate for the user completing shopping successfully at a first merchant and at a first future time and date. The recommendation system may determine a second success rate for the user completing shopping successfully at a second merchant and at a second future time and date. The recommendation system may generate a recommendation based on comparing the first and second success rates.

In many aspects, benefit factors that may promote the user to complete shopping successfully may be determined. Accordingly, the success rate may be determined based on the benefit factors and risk factors. The benefit factors may include a user's calendar event and a price fluctuation of electricity in the geographic location.

Recommendation Systems for Patterned Purchase

Figure 1:
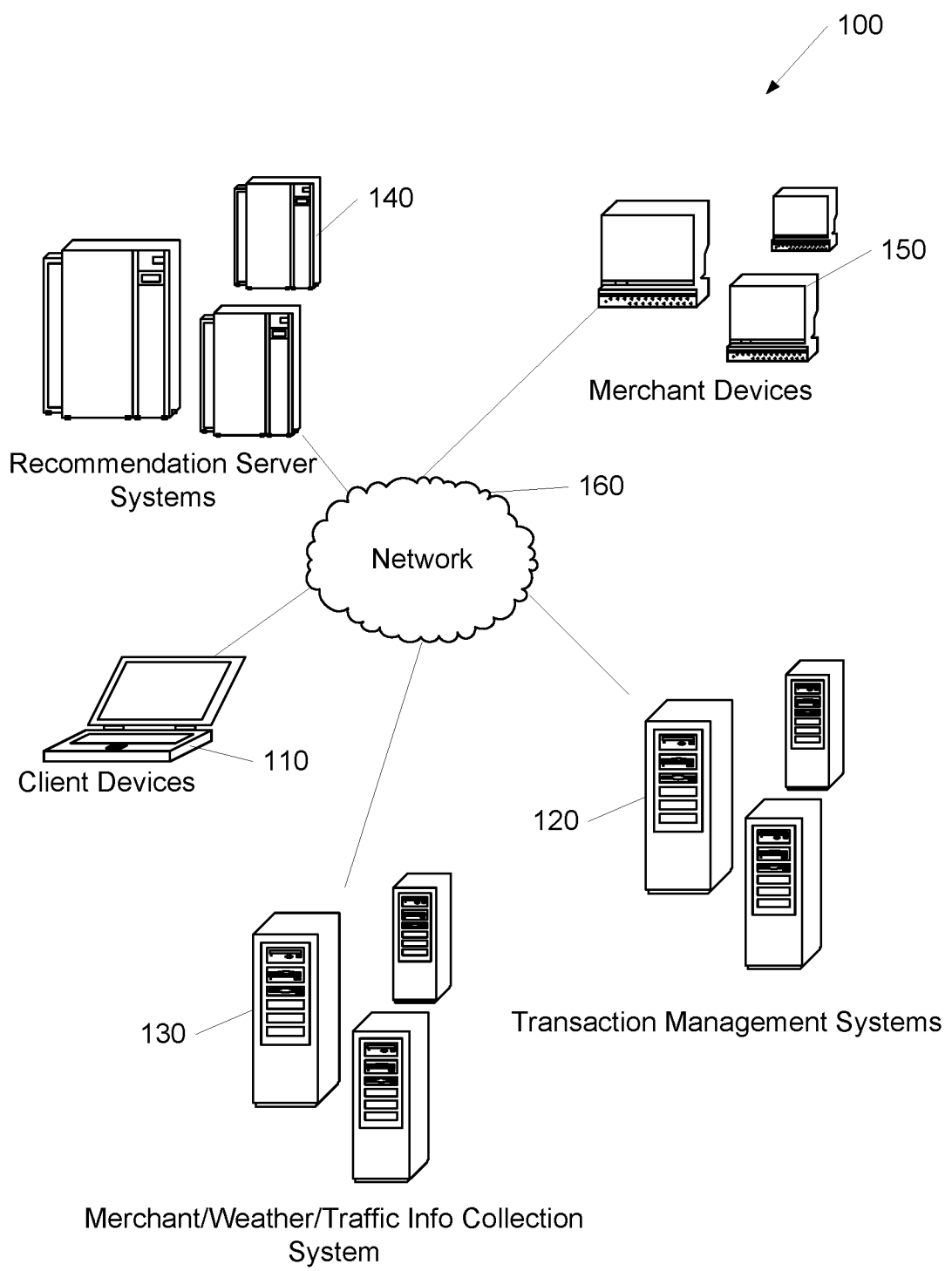
FIG. 1 shows an example of a recommendation system for patterned purchases in which one or more aspects described herein may be implemented.

FIG. 1 shows a recommendation system 100 for patterned purchases. The recommendation system 100 may include at least one client device 110, at least one transaction management system 120, at least one merchant/weather/traffic info collection system 130, at least one recommendation server system 140, and/or at least one merchant device 150 in communication via a network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may request patterned purchase recommendation sessions, validate session requests, and/or obtain recommendation information as described herein. Transaction management systems 120 may receive, process, store and send transaction information as described herein. The transaction information may include payment information, a timestamp (date and time) of a transaction, information on user identification, and/or merchant identification.

Merchant/weather/traffic information collection system 130 may collect, parse, and/or store merchant operation information, weather and traffic information related to a geographic location that the merchant resides. For example, merchant/weather/traffic information collection system 130 may obtain merchant operating information from a website of the merchant or Google Yellow Pages to determine the business hours, and whether the merchant is an open market etc. Merchant/weather/traffic information collection systems 130 may collect weather and/or traffic information to determine inclement weather and traffic predictions for the geographic area in which a particular merchant is located.

Recommendation server systems 140 may receive transaction information from transaction management systems 120. Recommendation server systems 140 and/or transaction management systems 120 may obtain transaction history from the customers and banking services, and merge transaction information from various merchants with different IDs. For example, a merchant in a geographic location may have two separate IDs. Recommendation server systems 140 or transaction management systems 120 may identify that these two IDs belong to the same merchant based on a point of sale, and merge the transaction information for these IDs. Recommendation server systems 140 may conduct a pattern analysis for a user to identify the frequencies and times that user may shop at each of the merchants. For example, recommendation server systems 140 may identify that a user shops at a merchant A 80% on Sundays and 20% on the rest of the week.

Recommendation server systems 140 may receive merchant operation information and compile weather/traffic information from merchant/weather/traffic information collection systems 130. For example, in the event there is a tornado watch on the coming Sunday, recommendation server systems 140 may recommend the user to shop on a Saturday. Recommendation server systems 140 may conduct an analysis for example, on an hourly, daily, and/or weekly basis dynamically for a predetermined period, such as a week from today. In the event that recommendation server systems 140 may detect a potential conflict, recommendation server systems 140 may provide a recommendation based on a second most frequent time. For example, a user may go shopping in a merchant A on Sunday 80% of the time, on Saturday 15% of the time and on the weekdays 5%. Recommendation server systems 140 may detect there is a conflict on Sunday and select a second most frequent time on Saturday to recommend to the user.

In a variety of embodiments, recommendation server systems 140 may select a time that a potential event may have the least impact. For example, when a hurricane approaches the geographic area of the merchant, the possibility of closing the merchant may increase overtime. Recommendation server systems 140 may recommend a time to shop at the earliest possible time to avoid the conflict event to interfere with the user's shopping experience. Recommendation server systems 140 may also recommend an alternative merchant and alternative time/date based on the success rates or confidence scores determined by machine learning classifiers.

In a variety of embodiments, recommendation server systems 140 may consider other factors that may potentially impact the user for completing the shopping successfully. For example, recommendation server systems 140 may consider holiday traffic pattern at a future date. Recommendation server systems 140 may consider the situation that there may be electricity for a certain time of the day and how the availability of electricity may impact the user's shopping experience. For example, a merchant may have electricity at certain hours of the day and if a user shops at certain hours, such as 2-4 pm, the merchant may have electricity and air conditioner to enhance the user's shopping experience. Recommendation server systems 140 may consider risk factors that may negatively impact the user to complete shopping successfully. Recommendation server systems 140 may consider the beneficial factors that may enhance the user's shopping experience or promote the user to complete shopping successfully. Recommendation server systems 140 may create a risk profile based on a summary of these risk and benefit factors. Recommendation server systems 140 may also incorporate events in a personal calendar of the user into the risk profile.

The transaction management systems and/or merchant devices may be associated with a particular authentication session. Transaction management systems 120 may store a variety of transaction information, merge transaction information based on merchant IDs, and/or share transaction information with client devices or recommendation server systems 140 as described herein. However, it should be noted that any device in the recommendation system 100 for patterned purchases may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in recommendation system 100 for patterned purchases may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the item level data prediction system 100 in front of one or more computing devices such that any external devices may communicate directly with the specialized hardware.

Computing Devices

Figure 2:
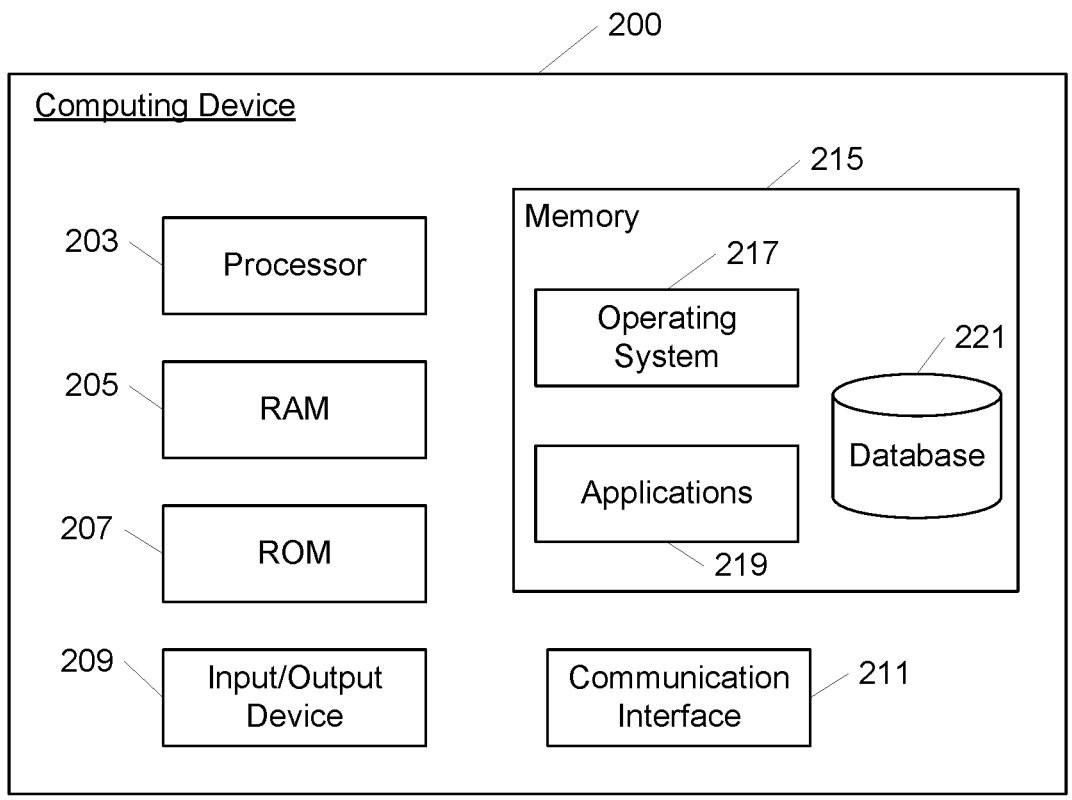
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Making Recommendations for Patterned Purchases

Figure 3:
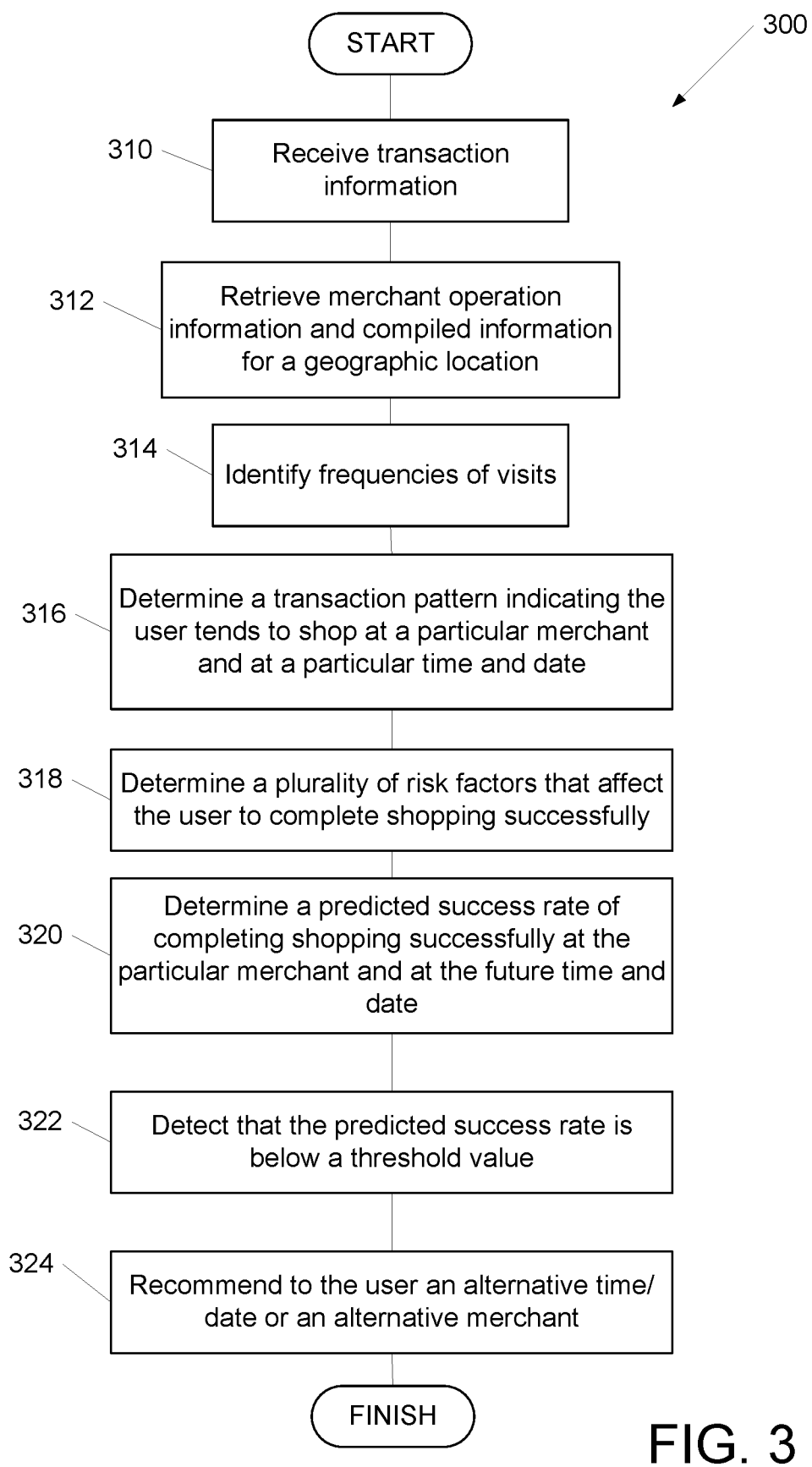
FIG. 3 is an example flow chart for making recommendations for patterned purchases in accordance with one or more aspects described herein.

A recommendation system for patterned purchases may identify potential conflict and risk factors that may impact a user to complete shopping successfully and offer alternative time/date or merchant to promote success rate and enhance shopping experiences. FIG. 3 shows a flow chart of a process for making recommendations for patterned purchases according to one or more aspects of the disclosure. Some or all of the steps of process 300 may be performed using one or more computing devices as described herein. In a variety of embodiments, some or all of the steps described below may be combined and/or divided into sub-steps as appropriate.

At step 310, transaction information may be retrieved for a user. The user may initiate a transaction with a merchant device when the user shops at a merchant in a geographic location. The transaction information may include a transaction time and date, the user ID and a merchant ID. For example, a user may go to a Meijer at Champaign, Ill. for grocery shopping at 2 PM on a Sunday. When the user checks out at the merchant, a recommendation system may receive the transaction information from a Point of Sale (POS) device at the merchant. This transaction information may also be sent from the merchant to a transaction management system, which may in turn send the transaction information to the recommendation system.

At step 312, merchant operation information and compiled information for a geographic location may be retrieved. The merchant operation information may include regular business hours, extended or shortened business hours during holidays, the type of the merchant (such as an open market), and/or the geographic location of the merchant. Based on the geographic location, the compiled information including the traffic or weather information may be collected, parsed, and processed. The traffic and weather information may be collected by the merchant/weather/traffic info collection systems. In a variety of embodiments, the merchant/weather/traffic info collection systems may obtain the relevant information via an API provided by a weather or traffic service.

In a variety of embodiments, the merchant operation information may include business hours and other operation information from a website of the merchant. The merchant/weather/traffic info collection systems may use web scraping to extract large amounts of data from websites by using a scraper. The scraper may send HTTP "GET" queries to the specific websites and parse HTML documents based on the received results. The parsed HTML documents can be used to extract specific features and data from the obtained web pages. The merchant/weather/traffic info collection systems may use other web automation to interact with a merchant's website, enter a zip code corresponding to the geographic area, and retrieve the relevant operation information. The merchant/weather/traffic info collection systems may use web scraping and other web automation to interact with a weather or traffic website, enter a zip code corresponding to the geographic location, and retrieve the relevant weather or traffic information. The merchant operation information may include advertisement flyers distributed by the merchant or newspapers containing the weather or traffic information, and the flyers may be scanned and stored as documents in PDF or other formats.

In a variety of embodiments, the merchant/weather/traffic info collection systems may parse the advertisement information and newspapers using various technologies. For example, an advertisement may state "the store opens 24 hours on Black Friday" on a merchant's website or a flyer. The merchant/weather/traffic info collection systems may parse this information to obtain a specific location and/or date. For example, "Black Friday" may be translated into Nov. 29, 2019 if the advertisement is relevant to a recommendation being made in the year 2019. A newspaper may have a weather forecast section or an upcoming event that may affect the traffic pattern. The advertisement information or newspapers may be parsed using Natural Language Processing (NLP) to process the language of the advertisement or the newspapers, and extract the relevant information such as the business hours that the merchant operates, the forecast of a storm or an upcoming event in the newspapers that may affect the traffic pattern.

The advertisement information or newspapers may be parsed using Optical Character Recognition (OCR). For example, the merchant/weather/traffic info collection systems may convert advertisement information in a scanned document, a photo of a document, or printed text into machine-encoded text, which may be recognized by the merchant/weather/traffic info collection systems and extract the relevant merchant operation information, weather and traffic information.

At step 314, frequencies of visits may be identified. The recommendation system may identify frequencies of visits associated with a plurality of merchants based on the transaction information. In a variety of embodiments, the recommendation system may initiate a formalization process, such as identifying the merchant IDs that belong to the same merchant and merging the transaction information based on a POS. After the transaction information is formalized, the recommendation system may conduct a frequency analysis to determine the number of visits by the users for each of the merchants. The recommendation system may retrieve historic transaction information from customers and convert the time information into frequency information. For example, the recommendation system may retrieve the time information including the timestamps and the merchant ID for each transaction conducted by the customer, using algorithms such as Discrete Fourier Transform (DFT), to convert the information from its original time domain (timestamps of transaction) and space domain (merchant locations) to a representation in the frequency domain (how many visits per merchant) for common merchants. The recommendation system may identify common merchants when a merchant has been visited by a threshold frequency, such as 1000 visits/per day.

At step 316, a transaction pattern may be determined. The transaction pattern may indicate that a user tends to shop at a particular merchant and at a particular time/date based on the frequencies of visits. For example, the recommendation system may determine a transaction pattern that a user may go shopping in a grocery store A on Sunday 80% of the time, on Saturday 15% of the time and on the weekdays 5%. The recommendation system may determine a transaction pattern that another user may go shopping in an open market B on Sunday 70% of the time, in a grocery store C on Saturday 20% of the time and in the grocery store C on the weekdays 10% of the time.

At step 318, a plurality of risk factors that affect the user to complete shopping successfully may be determined. In a variety of embodiments, the risk factors may include a store closure, bad weather predictions such as a tornado or hurricane forecast, traffic patterns such as holiday traffic impact, and/or potential conflict with a scheduled event on the user's personal calendar. For example, if the user works as a restaurant server and the calendar shows that she has to work late on a Saturday night, the recommendation system may detect that the user usually shops at the grocery store on Saturday nights and identify a potential conflict. The recommendation system may identify this event as a potential risk factor based on her personal calendar. In some undeveloped areas, the risk factors may include the availability of electricity. A merchant may only have electricity during certain periods of the day. For example, if the user usually shops at 2-4 pm on a Saturday, the recommendation system may determine that the merchant may have no electricity and operating air conditioner during this timeframe in the coming Saturday and may identify the lack of electricity as a risk factor.

The recommendation system may also consider benefit factors that may promote the user to complete shopping successfully. These benefit factors may be related to the risk factors. The benefit factors may include price fluctuations at different times of the day. For example, if the user shops at a certain time of the day, the user may save electricity by turning off the air conditioner at home while the user is at the merchant. The benefit factors may include an event on the personal calendar, such as a day off from work.

In a variety of embodiments, the recommendation system may create a risk profile based on these risk factors. The recommendation system may create a risk profile based on both the risk factors and benefit factors.

At step 320, a predicted success rate of completing shopping successfully at the particular merchant and at the future time and date may be determined. The recommendation system may determine the predicted success rate using the risk factors including the operation information and the compiled information. In a variety of embodiments, the recommendation system may determine a predicted success rate using some predetermined criteria based on the merchant operation, weather, and/or traffic information. For example, the predetermined criteria may stipulate that when the merchant has 90% chance of closing, the predicted success rate would set to be 10%. The predetermined criteria may also stipulate that when the 99% of chance of rain and a wind speed more than 40 miles per hour, the predicted success rate would set to be 5%.

The recommendation system may create a risk profile based on these risk factors using machine learning classifier. The recommendation system may use the machine learning classifier, take the risk profile including the risk factors as inputs, and determine the success rate that the user may complete shopping successfully as an output. In a variety of embodiments, the recommendation system may assign a weight factor to each of the risk factors. For example, a store closing may be a risk factor assigned with a relatively heavier weight, while a weather event may be a risk factor assigned with a relatively lighter weight. Other risk factors, such as duration of the user may spend in the merchant or the duration to commute to the merchant may also be candidates as the inputs for the machine learning classifier and these risk factors may be assigned with the appropriate weights.

In a variety of embodiments, the machine learning classifier may include a Generative Adversarial Network (GAN) model, which may include a generator and a discriminator. The machine learning classifier may filter through big transaction data that is related to a large number of users associated with various merchants. The machine learning classifier may output both a success rate and a confidence score in a confidence metric. The confidence metric may be an indication of how sure the machine learning classifier is in the calculated success rate. The machine learning classifier may have access to hundreds of thousands of records indicating various users visiting the merchants at different times and dates (presuming the success rate is 100% given these transactions have already occurred in the past), the corresponding records on the merchant operation information and weather/traffic information related to the geographic locations that the merchants reside. Based on a first set of inputs (such as merchant operation information, weather, and/or traffic patterns), the machine learning classifier may predict whether the user may complete shopping successfully (e.g. 100% success rate) with a first confidence score. Based on a second set of inputs (such as merchant operation information, weather, and/or traffic patterns), the machine learning classifier may predict whether the user may complete shopping successfully (e.g. 100% success rate) with a second confidence score. The accuracy of the prediction may improve over time as indicated by the confidence scores.

In a variety of embodiments, after going through several iterations of training process, the machine learning classifier may generate outputs such as a success rate for the user to complete shopping successfully (e.g. 100%) at various times/dates and various merchants, and the corresponding confidence metric. During the training process, the machine learning classifier may also train the risk or benefit factors and assign the appropriate weight for each of these factors. The machine learning classifier may consider these factors individually one at a time, or as a cluster of factors. For example, the machine learning classifier may take a weather event as an input and generate a corresponding success rate based on this event. The machine learning mechanism may also consider a cluster of factors, such as a weather event and a traffic event as inputs, and determine the corresponding success rate based on these events. As such, the machine learning classifier may use a multi-factor approach, to train the model over time and make more accurate predictions.

After the machine learning classifier is trained with the appropriate set of risk factors and weights, the machine learning classifier may determine a specific success rate for the user to complete shopping successfully at a particular merchant and at a future time/date. The machine learning classifier may also determine a confidence score associated with the specific success rate.

At step 322, the predicted success rate may be detected to be below a threshold value. For example, the recommendation system may set the threshold value to be 50% and detect that the predicted success rate for completing shopping at the merchant and at the future time/date falls below the 50% threshold. The threshold value may be an arbitrary value that may be meaningful to the user, and the user may configure this threshold value based on the user's preference.

At step 324, an alternative time/date or an alternative merchant may be recommended to the user. For example, after detecting that the success rate for the user to complete shopping at merchant A and at 8 pm on Saturday falls below 50%, the recommendation system may recommend the user to shop at a different merchant B at 8 pm on Saturday. The recommendation system may also recommend the user to shop at merchant A at 8 pm on Sunday.

In a variety of embodiments, the recommendation system may recommend based on the frequency analysis. For example, based on the frequency analysis, the recommendation system may identify a second most frequent time (e.g. Sunday 8 pm at merchant A), and a third most frequent time (e.g. Saturday 8 pm at merchant B) that the user shops at merchant A. The recommendation system may recommend the second most frequent time Sunday 8 pm at merchant A as an alternative to the user.

In a variety of embodiments, the recommendation system may recommend an optimal merchant and time/date that may have the highest success rate. Using a machine learning classifier, the recommendation may determine the success rate for various merchants and times/dates. For example, based on the frequency analysis, the recommendation system may identify a second most frequent time (e.g. Sunday 8 pm at merchant A), and a third most frequent time (e.g. Saturday 8 pm at merchant B) that the user shops. The recommendation system may determine the success rate corresponding to the second most frequent time and the third most frequent time. In the event the success rate for the third most frequent time is higher than the second most frequent time, the recommend system may recommend the third most frequent time to the user to go shopping such as at 8 pm on Saturday at sore B.

Figure 4:
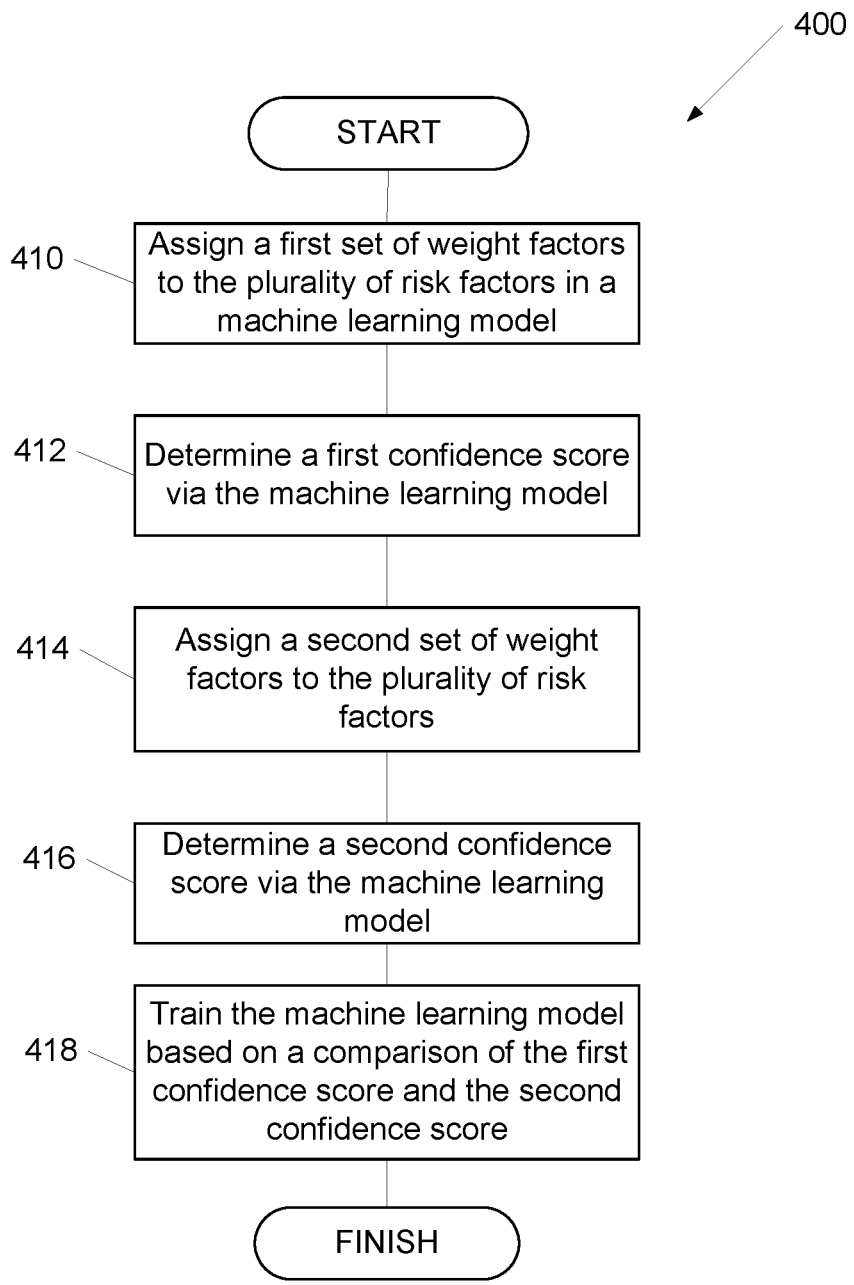
FIG. 4 shows an example flow chart of a process for training a machine learning classifier according to one or more aspects of the disclosure.

FIG. 4 shows an example flow chart for training a machine learning classifier according to one or more aspects of the disclosure. Some or all of the steps of process 400 may be performed using one or more computing devices as described herein. In a variety of embodiments, some or all of the steps described below may be combined and/or divided into sub-steps as appropriate.

The success rate and confidence score may be determined using a machine learning classifier or model such as a GAN model, which may use the risk profile or a plurality of risk factors as inputs for the GAN model. The GAN model may be trained by assigning different weight factors to the risk factors. The risk factors may include, a store closing event, a weather event such as a tornado or hurricane, a traffic event such as holiday shopping traffic, a power outage event and other events that may impact the user to complete shopping successfully. Given the training data for training the machine learning classifier are historic transaction data related to transactions actually occurred in the past, the success rate for the user to complete shopping successfully may be set to be 100%.

At step 410 a first set of weight factors to the plurality of risk factors may be determined in a machine learning classifier. For example, the recommendation system may assign a store closing event a weight factor of 2, a power outage event a weight factor of 1, a weather event a weight factor of 1 and a traffic event a weight factor of 1.

At step 412, a first confidence score may be determined via the machine learning classifier. Based on the risk factors and their corresponding first set of weight factors, the machine learning classifier may determine a first success rate (e.g. 100%) for the user to complete the shopping successfully with a first confidence score. Related to the first success rate, the machine learning classifier may determine a first probability that the user may complete the shopping successfully and a first confidence score associated with the first probability.

At step 414, a second set of weight factors to the plurality of risk factors. For example, the recommendation system may assign a store closing event a weight factor of 10, a power outage event a weight factor of 5, a weather event a weight factor of 2 and a traffic event a weight factor of 1.

At step 416, a second confidence score may be determined via the machine learning classifier. Based on the risk factors and their corresponding second set of weight factors, the machine learning classifier may determine a second success rate (e.g. 100%) for the user to complete the shopping successfully and a second confidence score. Related to the second success rate, the machine learning classifier may determine a second probability that the user may complete the shopping successfully and a second confidence score associated with the second probability.

At step 418, the machine learning classifier may be trained based on a comparison of the first confidence score and the second confidence score. For example, the first success rate (e.g. 100%) may be associated with the first confidence score and the second success rate (e.g. 100%) may be associated with the second confidence score. In the event that the second confidence score is higher than the first confidence score, the machine learning classifier may select the second set of weight factors for the next round of iteration to train the machine learning classifier.

After several rounds of iterations, the machine learning classifier may be trained until a confidence score reaches a threshold value, such as 95%. The machine learning classifier may identify an optimal set of weight factors corresponding to the confidence score. Based on the risk factors and the optimal set of weight factors, the machine learning classifier may determine the predicted success rate for the user to complete shopping successfully at a particular merchant and a particular time/date in the future.

Figure 5:
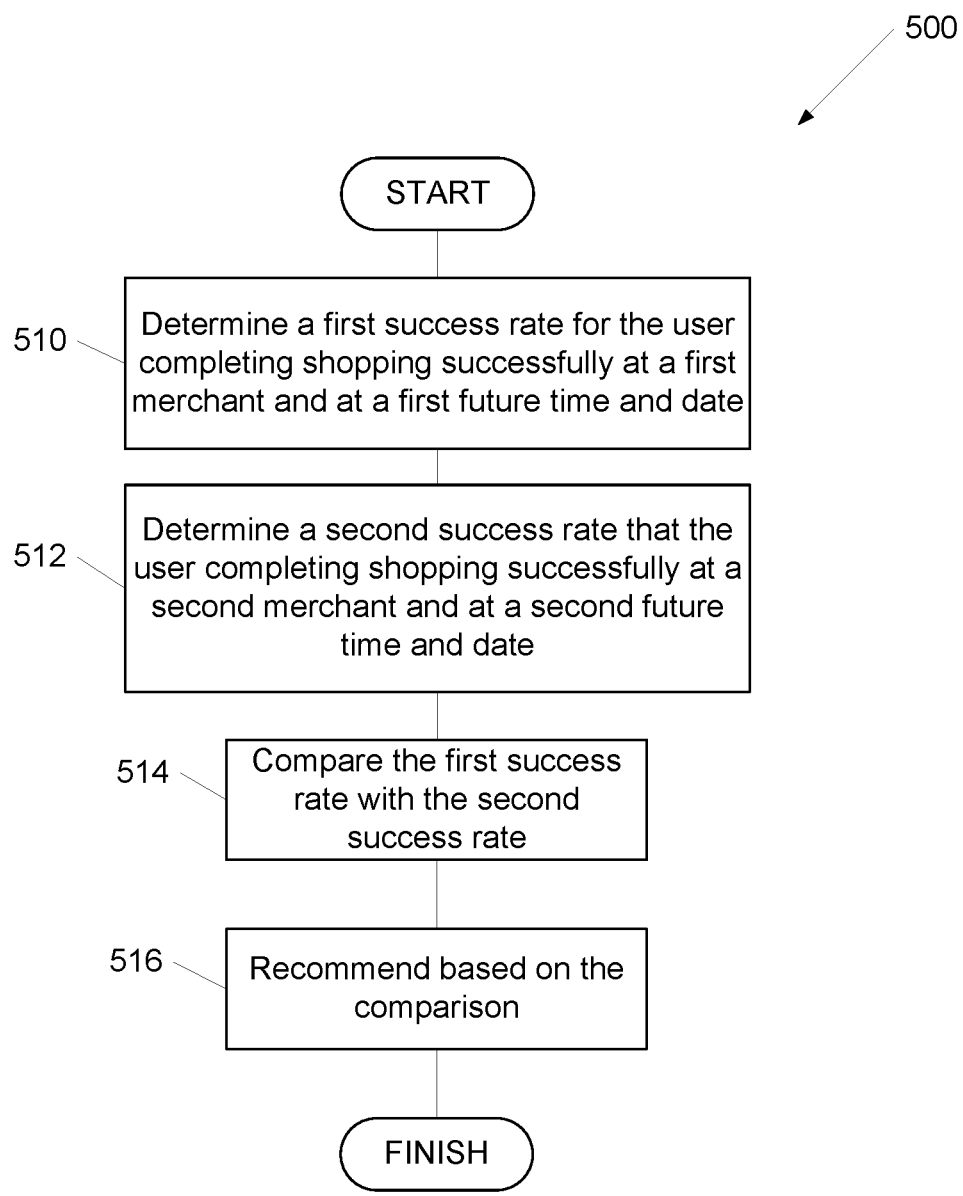
FIG. 5 shows an example flow chart for making recommendations based on success rates according to one or more aspects of the disclosure.

FIG. 5 shows an example flow chart for making recommendations based on success rates according to one or more aspects of the disclosure. Some or all of the steps of process 500 may be performed using one or more computing devices as described herein. In a variety of embodiments, some or all of the steps described below may be combined and/or divided into sub-steps as appropriate.

The recommendation system may detect that the predicted success rate falls below a threshold value, and make recommendations for alternative merchant and alternative time/date. The machine learning classifier may make a recommendation based on the success rates associated with the various confidence scores. The machine learning classifier may be trained with risk factors and the corresponding weight factors.

At step 510, a first success rate for the user completing shopping successfully at a first merchant and at a first future time and date may be determined. The recommendation system may have access to a plurality of data entries that correspond to different times that the user may shop at various merchants. The machine learning classifier may determine a success rate and the corresponding confidence metric for each of these data entries. For example, the machine learning classifier may determine a first success rate and a first confidence score for the user completing shopping successfully at 8 pm on a Sunday at merchant A.

At step 512, a second success rate for the user completing shopping successfully at a second merchant and at a second future time and date may be determined. For example, the machine learning classifier may determine a second success rate and a second confidence score for the user completing shopping at 8 pm on a Saturday at merchant B. Merchant A and merchant B may be the same.

At step 514, the success rates may be compared. The recommendation system may compare the first success rate with the second success rate.

At step 516, a recommendation may be generated based on the comparison of the success rates. For example, the recommendation system may determine that the second success rate is higher than the first success rate. The recommendation system may recommend the user to shop at 8 pm on a Saturday at merchant B as indicated by the second success rate. In a variety of embodiments, the recommendation system may also consider both the success rates and the confidence scores in making the recommendation. For example, even if the second success rate (95%) is slightly higher than the first success rate (94%), and when the second confidence score (45%) is much lower than the first confidence score (99%), the recommendation system may still recommend the user to shop at 8 pm on a Sunday at merchant A as indicated by the first success rate.

Although FIG. 5 illustrates making recommendations based on the success rates and/or confidence scores, in a variety of embodiments, the recommendation system may also make recommendations based on the frequency analysis. In the event that the predicted success rate corresponding to the most frequent time for a user falls below the threshold value, the recommendation system may consider the second and third most frequent time as alternatives. For example, the recommendation system may identify a second most frequent time (e.g. Sunday 8 pm at merchant A), and a third most frequent time (e.g. Saturday 8 pm at merchant B) that the user shops. The recommendation system may determine the success rates corresponding to the second most frequent time and the third most frequent time. If the success rate for the third most frequent time is higher than the second most frequent time, the recommend system may recommend the third most frequent time to the user to go shopping such as Saturday 8 pm at sore B.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a server system, transaction information for a user that is associated with a plurality of merchants in a geographic location;
   receiving, by the server system:
     operation information associated with the plurality of merchants; and
     compiled information associated with a user and the geographic location;
   processing, by the server system, the transaction information in a first format, wherein the first format is associated with a time domain and a space domain, and wherein the time domain indicates a timestamp of a transaction, and the space domain represents a location of a merchant in the transaction;
   converting, by the server system, the transaction information from the first format to a second format associated with a frequency domain, wherein the frequency domain indicates a frequency of visits of the merchant;
   identifying, based on the converted transaction information in the second format, frequencies of visits associated with the plurality of merchants;
   determining, for a user and based on the frequencies of visits, a transaction pattern, indicating the user tends to shop at a particular merchant and at a particular time and date;
   determining, based on the operation information and the compiled information, a plurality of risk factors that negatively impact the user from completing shopping successfully at the particular merchant and at a future time and date, wherein the plurality of risk factors comprise events associated with a store closing, a negative weather pattern and a negative traffic pattern;
   determining, for the user, by the server system and based on the plurality of risk factors, a predicted success rate of completing shopping successfully at the particular merchant and at the future time and date, by:
     assigning a first set of weight factors to the plurality of risk factors, wherein the plurality of risk factors are taken as inputs to a machine learning classifier;
     determining a first confidence score via the machine learning classifier based on the plurality of risk factors and the first set of weight factors;
     assigning a second set of weight factors to the plurality of risk factors;
     determining a second confidence score via the machine learning classifier based on the plurality of risk factors and the second set of weight factors;
     training the machine learning classifier based on a comparison of the first confidence score and the second confidence score; and
     determining the predicted success rate based on the trained machine learning classifier;
   detecting, by the server system, that the predicted success rate is below a threshold value; and
   after the detecting, a recommendation to a user device for an alternative time/date or an alternative merchant based on that a new predicted success rate associated with the alternative time/date or the alternative merchant is above the threshold value.

2. The computer-implemented method of claim 1, wherein the compiled information comprises weather information and traffic information associated with the geographic location.

3. The computer-implemented method of claim 1, wherein the operation information indicates operation hours of the particular merchant.

4. The computer-implemented method of claim 1, wherein sending the recommendation to the user device for the alternative time/date or the alternative merchant comprises:
   determining, based on the trained machine learning classifier, a first success rate and a corresponding first predicted confidence score for the user completing shopping successfully at a first merchant and at a first future time and date;
   determining, based on the trained machine learning classifier, a second success rate and a corresponding second predicted confidence score for the user completing shopping successfully at a second merchant and at a second future time and date;
   comparing the first success rate with the second success rate and the first predicted confidence score with the second predicted confidence score; and
   sending, to the user device, the recommendation for the alternative time/date or the alternative merchant based on the comparison.

5. The computer-implemented method of claim 1, wherein determining the predicted success rate comprises:
   determining a plurality of benefit factors that promote the user to complete shopping successfully at the particular merchant and at the future time and date; and determining the predicted success rate based on the plurality of risk factors and the plurality of benefit factors.

6. The computer-implemented method of claim 5, wherein the plurality of benefit factors comprise a user's calendar event and a price fluctuation of electricity in the geographic location.

7. The computer-implemented method of claim 1, wherein determining the transaction pattern comprises:
   determining, based on the frequencies of visits, common merchants associated with a plurality of users; and
   determining the transaction pattern for the user associated with the common merchants, wherein the transaction pattern indicates that the user prefers to shop at a particular merchant, of the common merchants, and at the particular time and date.

8. The computer-implemented method of claim 1, wherein the predicted success rate is associated with a duration of the user completing shopping at the particular merchant and at the future time and date.

9. A computing device comprising:
   one or more processors; and
   memory storing instructions that, when executed by the one or more processors, cause the computing device to:
      receive, from a plurality of users, transaction information that is associated with a plurality of merchants in a geographic location;
      receive:
         operation information associated with the plurality of merchants; and
         compiled information associated with the user and the geographic location;
      identify, based on the transaction information, frequencies of visits associated with the plurality of merchants;
      process the transaction information in a first format, wherein the first format is associated with a time domain and a space domain, and wherein the time domain indicates a timestamp of a transaction, and the space domain represents a location of a merchant in the transaction;
      convert the transaction information from the first format to a second format associated with a frequency domain, wherein the frequency domain indicates a frequency of visits of the merchant;
      determine, for a user of the plurality of users, and based on the transaction information in the second format, a transaction pattern, indicating the user tends to shop at a particular merchant and at a particular time and date;
      determine, based on the operation information and the compiled information, a plurality of risk factors that negatively impact the user from competing shopping successfully at the particular merchant and at a future time and date, wherein the plurality of risk factors comprise events associated with a store closing, a negative weather pattern and a negative traffic pattern;
      determining, for the user and based on the plurality of risk factors, a predicted success rate of completing shopping successfully at the particular merchant and at the future time and date by:
         assigning a first set of weight factors to the plurality of risk factors, wherein the plurality of risk factors are taken as inputs to a machine learning classifier;
         determining a first confidence score via the machine learning classifier based on the plurality of risk factors and the first set of weight factors;
         assigning a second set of weight factors to the plurality of risk factors;
         determining a second confidence score via the machine learning classifier based on the plurality of risk factors and the second set of weight factors;
         training the machine learning classifier based on a comparison of the first confidence score and the second confidence score; and
         determining the predicted success rate based on the trained machine learning classifier;
      detect that the predicted success rate is below a threshold value; and
      after the detecting, sending a recommendation to a user device for an alternative time and date, or an alternative merchant based on that a new predicted success rate associated with the alternative time/date or the alternative merchant is above the threshold value.

10. The computing device of claim 9, wherein the compiled information comprises weather information and traffic information associated with the geographic location, and the operation information comprises operation hours of the particular merchant.

11. The computing device of claim 9, wherein the instructions cause the computing device to:
   determine a plurality of benefit factors that promote the user to complete shopping successfully at the particular merchant and at the future time and date; and
   determining the predicted success rate based on the plurality of risk factors and the plurality of benefit factors.

12. The computing device of claim 11, wherein the plurality of benefit factors comprise a user's calendar event and a price fluctuation of electricity in the geographic location.

13. The computing device of claim 9, wherein the instructions cause the computing device to:
   determine, based on the trained machine learning classifier, a first success rate and a corresponding first predicted confidence score for the user completing shopping successfully at a first merchant and at a first future time and date;
   determine, based on the trained machine learning classifier, a second success rate and a corresponding second predicted confidence score for the user completing shopping successfully at a second merchant and at a second future time and date;
   compare the first success rate with the second success rate and the first predicted confidence score with the second predicted confidence score; and
   send a recommendation to a user device for the alternative time/date or the alternative merchant based on the comparison.

14. The computing device of claim 9, wherein the instructions cause the computing device to:
   determine, based on the frequencies of visits, common merchants associated with the plurality of users; and
   determine the transaction pattern for the user associated with the common merchants, wherein the transaction pattern indicates that the user prefers to shop at a particular merchant, of the common merchants, and at the particular time and date.

15. One or more non-transitory media storing instructions that, when executed by one or more processors, cause the one or more processors to perform steps comprising:
   receiving, from a plurality of users, transaction information that is associated with a plurality of merchants in a geographic location;
   receiving:

operation information associated with the plurality of merchants; and compiled information associated with the user and the geographic location;

identifying, based on the transaction information, frequencies of visits associated with the plurality of merchants;

processing the transaction information in a first format, wherein the first format is associated with a time domain and a space domain, and wherein the time domain indicates a timestamp of a transaction, and the space domain represents a location of a merchant in the transaction;

converting the transaction information from the first format to a second format associated with a frequency domain, wherein the frequency domain indicates a frequency of visits of the merchant;

determining, for a user of the plurality of users, and based on the transaction information in the second format, a transaction pattern, indicating the user tends to shop at a particular merchant and at a particular time and date;

determining, based on the operation information and the compiled information, a plurality of risk factors that negatively impact the user from competing shopping successfully at the particular merchant and at a future time and date, wherein the plurality of risk factors comprise events associated with a store closing, a negative weather pattern and a negative traffic pattern;

determining, for the user and based on the risk factors, a predicted success rate of completing shopping successfully at the particular merchant and at the future time and date by:

assigning a first set of weight factors to the plurality of risk factors, wherein the plurality of risk factors are taken as inputs to a machine learning classifier;

determining a first confidence score via the machine learning classifier based on the plurality of risk factors and the first set of weight factors;

assigning a second set of weight factors to the plurality of risk factors;

determining a second confidence score via the machine learning classifier based on the plurality of risk factors and the second set of weight factors;

training the machine learning classifier based on a comparison of the first confidence score and the second confidence score; and determining the predicted success rate based on the trained machine learning classifier;

detecting that the predicted success rate is below a threshold value;

after the detecting, determining, based on the trained machine learning classifier, a first success rate for the user completing shopping successfully at a first merchant and at a first future time and date;

determining, based on the trained machine learning classifier, a second success rate that the user completing shopping successfully at a second merchant and at a second future time and date;

comparing the first success rate with the second success rate; and sending a recommendation to a user device for an alternative time and date, or an alternative merchant based on the comparison.

16. The non-transitory media of claim 15, wherein the compiled information comprises weather information and traffic information associated with the geographic location, and the operation information comprises operation hours of the particular merchant.

17. The non-transitory media of claim 16, wherein the instructions cause non-transitory media to:

determine a plurality of benefit factors that promote the user to complete shopping successfully at the particular merchant and at the future time and date; and determining the predicted success rate based on the plurality of risk factors and the plurality of benefit factors.

18. The method of claim 1, wherein determining the predicted success rate of completing shopping successfully at the particular merchant and at the future time and date further comprises:

assigning weight factors to the plurality of risk factors comprising the events associated with the store closing, the negative weather pattern and the negative traffic pattern;

training the machine learning model based on the weight factors and the plurality of risk factors;

modifying the plurality of risk factors by adding or removing one or more risk factors from the plurality of risk factors;

dynamically adjusting the weight factors based on the modified plurality of risk factors; and re-training the machine learning model based on the adjusted weight factors.

* * * * *